United States Patent
Danger et al.

(10) Patent No.: US 8,615,079 B2
(45) Date of Patent: Dec. 24, 2013

(54) CRYPTOGRAPHY CIRCUIT PROTECTED AGAINST OBSERVATION ATTACKS, IN PARTICULAR OF A HIGH ORDER

(75) Inventors: Jean-Luc Danger, Antony (FR); Sylvain Guilley, Paris (FR)

(73) Assignee: Institut Telecom-Telecom Paristech, Paris (FR)

( * ) Notice: Subject to any disclaimer, the term of this patent is extended or adjusted under 35 U.S.C. 154(b) by 286 days.

(21) Appl. No.: 13/145,177

(22) PCT Filed: Jan. 18, 2010

(86) PCT No.: PCT/EP2010/050546
§ 371 (c)(1),
(2), (4) Date: Aug. 3, 2011

(87) PCT Pub. No.: WO2010/084106
PCT Pub. Date: Jul. 29, 2010

(65) Prior Publication Data
US 2012/0250854 A1 Oct. 4, 2012

(30) Foreign Application Priority Data
Jan. 20, 2009 (FR) ...................................... 0950341

(51) Int. Cl.
*G06F 21/00* (2013.01)

(52) U.S. Cl.
USPC ......................................................... 380/28

(58) Field of Classification Search
None
See application file for complete search history.

(56) References Cited

U.S. PATENT DOCUMENTS

2004/0028224 A1* 2/2004 Liardet et al. .................. 380/37
2008/0260145 A1 10/2008 Trichina

FOREIGN PATENT DOCUMENTS

| EP | 1398901 A1 | 3/2004 |
| EP | 1995906 A1 | 11/2008 |
| WO | 01/61916 A2 | 8/2001 |

OTHER PUBLICATIONS

P.C. Kocher: "Timing Attacks on Implementations of Diffie-Hellman, RSA, DSS, and Other Systems," Proceedings of CRYPTO'96, vol. 1109 of LNCS, (1996), pp. 104-113.

(Continued)

*Primary Examiner* — William Goodchild
(74) *Attorney, Agent, or Firm* — Baker & Hostetler LLP

(57) ABSTRACT

A cryptography circuit protected against observation attacks comprises at least one register R providing a variable x masked by the mask m, the masked variable being encrypted by a first substitution box S -in a cyclic manner. The circuit also comprises a mask register M delivering at each cycle a mask $m_t$, the transformation of m, the mask m being extracted from $m_t$ before being encrypted by a second substitution box S', the new mask m' obtained on output from this box S' is transformed into a mask $m'_t$ before being stored in the mask register M. The transformation consists of a bijection or a composition law making it possible to reduce or indeed to cancel any high-order attack in accordance with a model of activity of the registers R and M. Cryptography circuits are protected against high-order observation attacks on installations based on masking.

15 Claims, 6 Drawing Sheets

(56) References Cited

OTHER PUBLICATIONS

T. S. Messerges et al.: "Investigations of Power Analysis Attacks on Smartcards," USENIX—Smartcard '99, pp. 151-162, May 10-11, 1999, Chicago, USA.

S. Guilley et al.: "Differential Power Analysis Model and Some Results," Proceedings of WCC/CARDIS, pp. 127-142, Aug. 2004, Toulouse, France.

J. Blomer et al.: "Provably Secure Masking of AES," Proceedings of SAC '04, vol. 3357, pp. 69-83, Springer, Aug. 2004, Waterloo, Canada.

M. Akkar et al.: "A Generic Protection against High-Order Differential Power Analysis," LNCS, Proceedings of FSE '03, vol. 2887 of LNCS, Springer, 2003, Berlin.

J. Lv et al.: "Enhanced DES Implementation Secure Against High-Order Differential Power Analysis in Smartcards," Information Security and Privacy, 10th Australian Conference, vol. 3574 of LNCS, pp. 195-206, Brisbane, Jul. 2005, Springer-Verlag.

F.-X. Standaert et al.: "FPGA Implementations of the DES and Triple-DES Masked Against Power Analysis Attack," Proceedings of FPL 2006, Aug. 2006, Madrid.

E. Peeters et al.: "Improved Higher-Order Side-Channel Attacks with FPGA Experiments," CHES, vol. 3659 of LNCS, pp. 309-323, Springer-Verlag, 2005.

G. Piret et al.: "Security analysis of higher-order Boolean masking schemes for block ciphers (with conditions of perfect masking)", IET Information Security, 2008, vol. 2, No. 1, pp. 1-11.

Houssem Maghrebi et al.: "Evaluation of Countermeasure Implementations Based on Boolean Masking to Thwart Side-Channel Attacks," Signals, Circuits and Systems (SCS), 2009 3rd International Conference on, IEEE, Piscataway, NJ, USA, Nov. 6, 2009, pp. 1-6.

C. Gebotys: "Third Order Differential Analysis and a Split Mask Countermeasure for Low Energy Embedded Processors," Internet Citation, [Online] XP002455442, retrieved Oct. 18, 2007.

L. Goubin et al.: "DES and Differential Power Analysis the Duplication Method," Cryptographic Hardware and Embedded Systems. IST International Workshop, CHES '99. Worcester, MA, Aug. 12-13, 1999 Proceedings; [Lecture Notes in Computer Science], Berlin: Springer, DE, vol. 1717, Aug. 1, 1999, pp. 158-172.

\* cited by examiner

US 8,615,079 B2

CRYPTOGRAPHY CIRCUIT PROTECTED AGAINST OBSERVATION ATTACKS, IN PARTICULAR OF A HIGH ORDER

CROSS-REFERENCE TO RELATED APPLICATIONS

This application is a National Stage of International patent application PCT/EP2010/050546, filed on Jan. 18, 2010, which claims priority to foreign French patent application No. FR 09 50341, filed on Jan. 20, 2009, the disclosures of which are incorporated by reference in their entirety.

FIELD OF THE INVENTION

The present invention relates to a cryptography circuit protected against observation attacks. It applies notably for the protection of cryptography circuits against high-order observation attacks on installations based on masking.

BACKGROUND OF THE INVENTION

The aims of cryptography are notably to protect:
either the confidentiality of an item of information, by means of encryption and of the dual operation: decryption;
or only the authenticity of an item of information, by the operations of signature and verification, by the operations of signature and of verification of signatures.

Cryptography uses mathematical procedures, which have been demonstrated to lead to secure systems. For example, an encryption is presumed secure when it is proven that there do not exist, in the current state of the published knowledge, any procedures of attack significantly faster than exhaustive attack, corresponding to the trying of all the possible keys.

In general, encryption procedures involve complex computations, necessary for the security of systems. This complexity does not pose any particular problems to computers but is a serious drawback in the case of devices that do not have high computational power, generally driven by low-cost "8-bit" microprocessors. The consequences may be of several kinds, such as:
an impediment to proper use, a typical example would be a bank card taking several minutes to sign a bill;
a denial of service, a typical example would be a pay-per-view television decoder not being able to track the throughput of information delivered.

To alleviate this difficulty without increasing the price of systems, it is customary to append a system for aiding the central unit of the device used, in the form of a coprocessor dedicated to cryptography.

However, whether it be implemented by the central unit or by a specialized coprocessor, the cryptography algorithm is implemented by a physical device, currently of electronic type. These physical devices exhibit inevitable imperfections, related to properties inherent in the basic laws of electricity.

Thus, cryptography systems that are secure from the mathematical point of view may be attacked by exploiting the inherent imperfections of the physical systems implementing the algorithm, thus:
the duration of the computations may depend on the values of the data, in particular on speed-optimized software systems, this having given rise to the attacks of the "Timing attack" type described notably in the document by P. Kocher et al: Timing Attack on Implementation of Diffie-Hellman, RSA, DSS and other systems, In Proceedings of CRYPTO'96, volume 1109 of LNCS, pages 104-113, Springer-Verlag, 1996, these attacks making it possible in certain cases to retrieve the entirety of the secret keys on the basis of simple measurements of execution time;
the instantaneous consumption may also depend on the data, this having given rise to a series of attacks such as:
the SPA (Simple Power Analysis) attack described notably in the document by Thomas S. Messerges et al: Investigations of Power Analysis Attacks on Smartcards, In USENIX—Smartcard'99, pages 151-162, May 10-11, 1999, Chicago USA, this attack attempting to differentiate the operations executed by a central unit on the basis of a measurement of its electrical consumption measured during a cryptographic operation;
the DPA (Differential Power Analysis) attack described notably in the document by S. Guilley et al: Differential Power Analysis Model and some Results, In Proceedings of WCC/CARDIS, pages 127-142, August 2004, Toulouse, France, this attack using statistical operations on numerous measurements of electrical consumption, which are performed during cryptographic operations on random messages and with a constant key, in order to validate or invalidate an assumption made about a limited part of the key;
any electric current flowing in a conductor produces an electromagnetic field whose measurement can give rise to attacks of the EMA (ElectroMagnetic Attack) type which are identical in their principle to attacks pertaining to electrical consumption;
certain attacks intentionally disturb the operation of systems so as to exploit the erroneous results in order to retrieve the secrets of the system, these attacks being known by the term fault injection attacks.

Any imperfection of a physical device implementing a cryptography algorithm and liable to leak information related to the secrets held in the memory of the device is called a hidden channel.

Protections against these attacks on the hidden channels have been proposed, on the basis notably:
of concealment, which involves rendering the leakage constant, in this instance independent of the secret;
of masking, which involves rendering the leakage random, unpredictable and therefore unexploitable.

These two techniques make it possible to increase the difficulty of attacks aimed at retrieving information, but they remain vulnerable, however, to attacks which would profit from implementational defects. There exist numerous examples of potential or substantiated vulnerabilities, for example:
concealment based on differential logic (such as WDDL) may be vulnerable to an attack on differences in cumulative combinatorial lags between one or the other of the phases of the calculation, evaluation phase and precharge phase;
masking, which may be sensitive to high-order attacks, termed HO-DPA.

SUMMARY OF THE INVENTION

An aim of the invention is notably to allow effective protection against high-order observation attacks. For this purpose, the subject of the invention is a cryptography circuit comprising at least one register R providing a variable x masked by a mask variable m, characterized in that said masked variable being encrypted by a first substitution box S in a cyclic manner, said circuit comprises a mask register M delivering at each cycle a transformed mask $m_t$ equal to the mask m transformed by a modification function, this mask m being encrypted by a second substitution box S', the new mask m' obtained on output from this box S' being used to mask the variable.

The new transformed mask $m'_t$ is for example introduced into the mask register M after having been subjected to the inverse modification on output from the second substitution box S'.

In a first possible mode of implementation, the modification may be a bijection B such that the transformed mask $m_t$ is stored in the register M, the mask m applied to the substitution box being equal to $B(m_t)$ and the new value to be stored in the register being $B^{-1}$, m' being the output from the second substitution box S' (21).

The bijection B is for example such that the Hamming weight of the mask m is not always identical to the Hamming weight of its image under the bijection B(m).

In a second possible mode of implementation, the modification of the mask m may be performed by decomposition into two sub-masks $m_1$ and $m_2$ such that $m=m_1\theta m_2$ where $\theta$ is a group composition law, the first sub-mask $m_1$ being stored in a first mask register M1 and the second sub-mask $m_2$ being stored in a second mask register M2, the new value to be stored in the register M1 being $m'_1=m'\theta^{-1}m'_2$ and the new value to be stored being $m'_2$, m' being the value of the mask on output from the second substitution box S".

The composition law is for example the XOR "exclusive or" operation, the addition operation, the multiplication operation or else the operation of the type s=a*b+(a+b)/2, * being multiplication and + being addition.

The of composition has for example a Hamming distance between two consecutive sub-masks $m_2$ from one cycle to another, $\Delta m_2$, that is non-zero.

The sub-masks $m_1$, $m_2$ having an even number of bits, the group composition law ($\alpha$) making it possible to obtain the mask m on the basis of the sub-masks $m_1$, $m_2$ satisfies for example:

$\Delta m_2=1$ per groups of 2 bits;
$m=m_1\oplus m_2$ if $m_2 MSB=1$ or $m=m_1$ if $m_2 MSB=0$
$m_2 MSB$, $m_2 LSB$ being respectively the high-order and low-order bits of the sub-mask $m_2$.

The circuit comprises for example a random-values generator, said generator delivering the value of the second sub-mask $m'_2$.

This sub-mask $m_1$ arising from the first mask register M1 may be saved in the second mask register M2 at the end of the cycle, the first register M1 receiving for its part the new mask $m'_1$ so as to reconstruct the new complete mask $m'=m'_1\theta m'_2$.

The encipherment algorithm being of the DES type, the path of the data x, m being split into two parts, left and right, said circuit comprises for example in addition to the left mask register ML and the right mask register MR a third mask register M, the register MR containing the right sub-mask $m_{r1}$ and the register ML containing the left sub-mask $m_{l2}$, the register M containing the sub-mask $m_{r2}$ equal to the sub-mask $m_{l1}$, the effective values of the right mask $m_r$ and of the left mask $m_l$ being such that:

$m_r=m_{r1}\theta m_{r2}$ $m_l=m_{l1}\theta m_{l2}.$

The second substitution box S' comprises for example two boxes identical to the first substitution box S and two XOR gates, the outputs of the two boxes being connected to an XOR gate whose output delivers the new mask m', the masked variable (x⊕m) entering a box and the other XOR gate whose other input receives the mask m, the output of this gate entering the other box.

A ROM memory carries out for example the logic of the XOR gates and the substitution of the boxes.

BRIEF DESCRIPTION OF THE DRAWING

Other characteristics and advantages of the invention will become apparent with the aid of the description which follows offered in relation to appended drawings which represent.

DETAILED DESCRIPTION

Figures 1A, 1B:
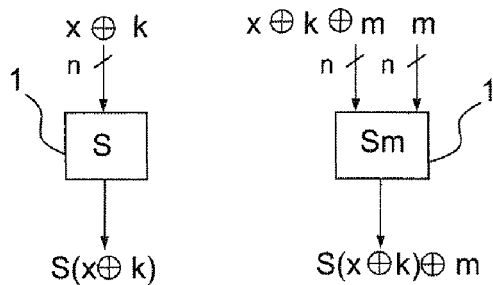
FIGS. 1a and 1b, an illustration of the principle of masking of a substitution box.

FIGS. 1a and 1b illustrate the principle of the masking of a substitution box 1, called generally an "S-box", with a constant mask m. An S-box applies to a message a non-linear function the aim of which is notably to render the message entropic on output from the S-box.

In FIG. 1a, a datum x is combined on input to the S-box 1 with a cryptography key k. In this example the datum and the key are combined by an "exclusive or" logic operation also called xor and which will subsequently be denoted ⊕. In the case of FIG. 1a, the message x⊕k coded on n bits for example, is therefore input to the S-box. The corresponding output message is S(x⊕k).

FIG. 1b shows the masking of the S-box with a constant mask m. The technique of masking relies on the garbling of the internal variables sensitive dependent on a secret by a mask m. In the example of FIGS. 1a and 1b, x is such a variable. Given that m cannot be predicted by an attacker, the leakages are unexploitable within the framework of a direct attack on x. The variable x no longer exists as such, but may be reconstructed through the pair of signals (m,$x_m$) where $x_m=x\theta m$ is the variable to be masked and $\theta$ is a group operator which may be notably logical or arithmetical. In the example of FIG. 1b, the masking uses the xor function, i.e. $x_m=x\oplus m$.

This type of masking is particularly suitable for the protection of the DES (Data Encryption Standard) and AES (Advanced Encryption Standard) algorithms, where the linear operations are performed in a binary field. The mask may be applied to the internal variables which are generally vectors of bits, words, cryptographic functions. The masking at the level of a word renders it applicable both to software implementations and to hardware implementations. The realization of the masking is simple when the function $f$ where the masked variable is applied is linear as a function of the group law, i.e. $f(x\theta m)=f(x)\theta f(m)$.

The value of $f(x)$ may be reconstructed on the basis of $f(x\theta m)$ and m. $f(x)$ is thus extracted right at the end of the algorithm so as to avoid a leakage of information emanating from the variable x. The computations on x⊕m and m being decorrelated from x, there are no direct leakages of secrets.

If the function $f$ is non-linear, the masking mechanism becomes more complex since $f(x)$ cannot be recreated mathematically on the basis of $f(x\theta m)$ and $f(m)$. In the symmetric encryption algorithms, the non-linear part corresponds to the substitution boxes or S-box, thus for example the S-box 1 of FIGS. 1a and b. A commonplace software technique uses a ROM memory generating the non-linear function of the S-box, this function being denoted $S_m$, such that:

$$S_m(x \oplus m) = S(x) \oplus m$$

S being the function of the S-box before masking.

Consequently, the size of the memory goes from $2^n$ for S to $2^{2n}$ for $S_m$, n being the number of bits of the mask. FIGS. 1a and 1b illustrate this change.

This realization is not secure with a hardware installation where an iteration of the encryption algorithm is performed in a clock cycle. In this case, the transfers at the level of a register demask the data automatically. Indeed, considering by way of example the operator ⊕, a transfer may be described by the following relation:

$$x \oplus m \oplus S(x) \oplus m = x \oplus S(x)$$

The term x⊕m of this relation is the initial value on input to the S-box $S_m$, and the term $S(x) \oplus m$ is the final value on output from the S-box, the operator ⊕ between these two terms indicating the transition. The above relation shows indeed that the result of the transition $x \oplus S(x)$ is independent of the mask m.

The effectiveness afforded by the masking may be proved against first-order attacks which considers only the internal variable x, as shown notably in the document by J. Blomer et al: Provably Secure Masking of AES, In LNCS, editor, Proceedings of SAC'04, volume 3357, pages 69-83, Springer, August 2004, Waterloo, Canada. The information leakages emanating from the masking circuit may, however, be subjected to a second-order attack, or indeed one of a much higher order.

A second-order attack considers two variables $x_1$ and $x_2$. For example if $x_1$ and $x_2$ are masked by the same mask, the second-order attack utilizes the fact that $x_1 \oplus x_2 = x_1 \oplus m \oplus x_2 \oplus m$.

Implementations have been studied to overcome high-order attacks, as shown notably in the document by M. Akkar et al: A generic protection against High-oder differential Power Analysis, In LNCS, editor, Proceedings of FSE'03, volume 2887 of LNCS, Springer, 2003, Berlin, this document using constant masks. However, to obtain significant effectiveness a large increase in complexity is necessary. By way of example, it has been demonstrated that the DES algorithm requires at least three different masks and six extra S-boxes for each S-box in order to be resistant to high-order attacks by this procedure, as shown in the document by J. Lv et al, Enhanced DES implementation secure against differential power analysis in smart-cards, In Information Security and Privacy, 10th Australasian Conference, volume 3574 of LNCS, pages 195-206, Brisbane, July 2005, Springer Verlag.

In another known procedure, a new mask m is computed at each iteration. This procedure is notably described in the document by F-X. Standaert et al, FPGA Implementations of the DES and Triple-DES Masked Against Power Analysis Attack, In Proceedings of FPL 2006, August 2006, Madrid. The masked variable x⊕m of a register R is associated at each round with a new mask m arising from a register M. Thus at the end of a round, the variable x⊕m is transformed into $S(x) \oplus m'$ where the new mask m' is computed as a function of m and of x⊕m with the aid of a new S-box with function S'. This procedure offers a good complexity compromise since it associates only a single new S-box S' with each existing S-box S.

This implementation remains, however, prone to second-order attacks as shown notably in the document by E. Peeters et al, Improved Higher-Order Side-Channel Attacks with FPGA Experiments, In CHES, volume 3659 of LNCS, pages 309-323, Springer-Verlag, 2005.

Figure 2:
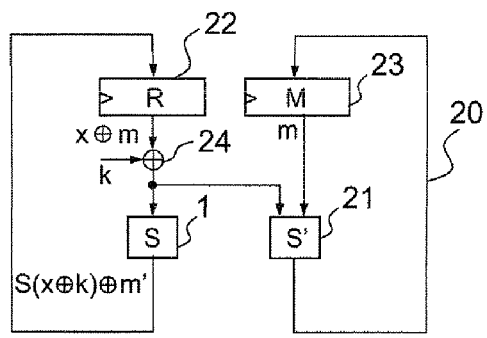
FIG. 2, an illustration of the masking at the level of a substitution box.

FIG. 2 illustrates the implementation of the S-boxes S and S'. A register 22, denoted R, provides the masked variable x⊕m with which is combined the key k, for example by an XOR gate 24, on input to the S-box S, with function S, which delivers as output the variable $S(x \oplus k) \oplus m'$ which is looped back to the input of the register 22, R. In parallel, a register 23, denoted M, provides the mask m which enters the S-box 21, with function S', the other input of the latter being common to the input of the S-box 1. The output of the S-box 21, S', delivers a new mask m' and is looped back to the input of the register M. This new mask is used to mask the variable x delivered by the register R. Throughout the rest of the description, the masks produced by the mask loop 20 comprising the mask register 23 and the S-box 21, S' will be used to mask the variable x.

The loopbacks to the registers R and M are each done in a clock tick. For simplicity reasons, the representation of FIG. 2 disregards the expansion and permutation functions specific to the DES algorithm.

The HO-DPA attack described in Peeters et al pertains to the variables x⊕m and m which arise from registers. The principle consists in studying the distributions of the activity at the output of registers for various values of the variable x. In CMOS logic, a model of activity denoted A may be the Hamming distance denoted DH between two consecutive words. In particular:

$$A(x \oplus m, m) = DH(x_i \oplus m_i, x_{i-1} \oplus m_{i-1}) + DH(m_i, m_{i-1}) \quad (1)$$

i.e.

$$A(x \oplus m, m) = PH(\Delta x \oplus \Delta m) + PH(\Delta m) \quad (2)$$

PH corresponds to the Hamming weight and Δx to the Hamming distance between two consecutive words $x_i$, $x_{i-1}$ of the variable x.

If x and m have a single bit, the activity corresponds to 2. PH(Δm) if Δx=0.

If Δx=1, the activity corresponds to $PH(\overline{\Delta m})+PH(\Delta m)$ and constantly equals 1.

The knowledge of the distributions of consumption for each Δx thus makes it possible to construct the HO-DPA attack by observing the consumption distributions and by comparing them with the predicted activity for an assumption regarding a key k included in the variable x.

If x and m are coded on 4 bits, the Hamming weight PH can take five values: 0, 1, 2, 3, 4. Therefore the activity A(x⊕m, m)=PH(Δx⊕Δm)+PH(Δm) can take nine values: 0, 1, 2, 3, 4, 5, 6, 7, 8.

Figure 3:
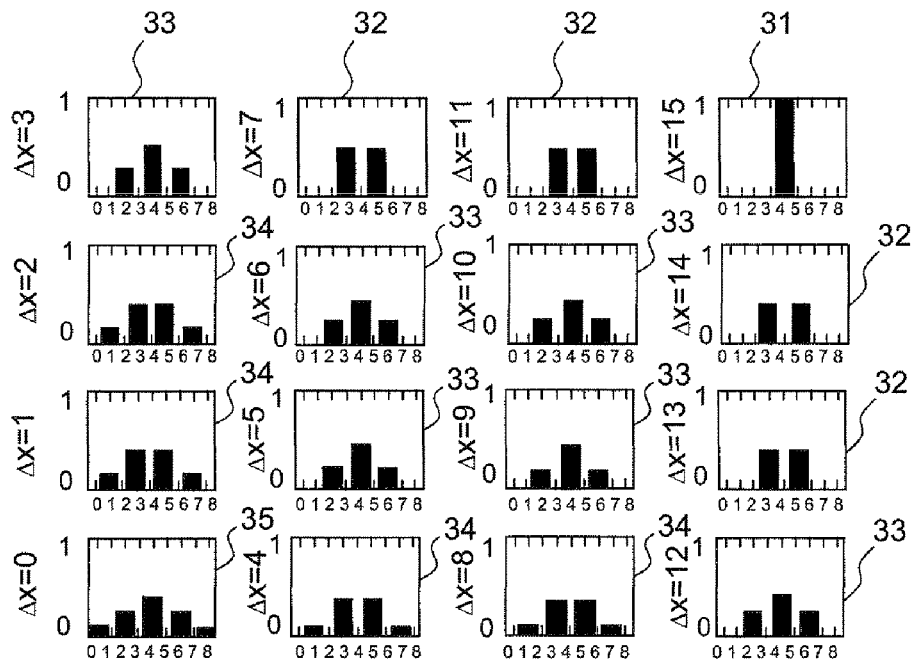
FIG. 3, a presentation of an example of distribution of activity at the output of a register for various values of the Hamming distance between two consecutive words of a variable x of the register.

FIG. 3 illustrates the distributions of the activity A for a mask of 4 bits for the various values of Δx possible, Δx taking in this case the $2^4$ values 0, 1, 2, 3, 4, 5, 6, 7, 8, 9, 10, 11, 12, 13, 14, 15. FIG. 3 therefore presents five different distributions 31, 32, 33, 34, 35 for the set of values of Δx. In each distribution 31, the value of Δx is distributed, or apportioned, as a function of the activity which can take the nine values 0, 1, 2, 3, 4, 5, 6, 7 and 8. Sharp differences between these distributions are apparent, these differences possibly being exploited by an HO-DPA attack.

To compare the effectiveness of various masking solutions, it is possible to use a metric quantity for comparing the distributions 31, 32, 33, 34, 35 which is inspired by a known test, the χ2 test, defined by the following relation:

$$\chi^2 = \sum_{i=1}^{C} \frac{(P_i - P_i ref)^2}{P_i ref} = \frac{1}{N} \sum_{i=1}^{C} \frac{(N_i - N_i ref)}{N_i ref} \quad (3)$$

where:
C represents the number of classes of the distribution, for example C=9 for the activity distributions with a mask coded on 4 bits, C−1 representing the degree of freedom of the χ2 law;
N is the total number of samples;
$P_i$ is the observed probability of having an element in class i, $P_i$ is also equal to $$\frac{N_i}{N},$$

$N_i$ being the number of elements observed in class i;
$P_i$ref is the reference probability of having an element in class i, $P_i$ref also being equal to $$\frac{N_i ref}{N},$$

$N_i$ref being the number of elements expected in class i.
The reference distribution is considered to be the mean of the 16 distributions obtained for all the values of z when the mask is coded on 4 bits. The value of χ2 in this case makes it possible to judge the homogeneity of all the distributions. By way of reference, χ2 equals 21.89 for the distribution with a mask of 4 bits. This value must be as low as possible to avoid discriminations between the distributions 31, 32, 33, 34, that are liable to be exploited by HO-DPA attacks. Stated otherwise, this value of the χ2 must be as low as possible to guard against HO-DPA attacks.

The invention makes it possible to guard against such observation attacks, including those of high order, by reducing the discriminations, or the differences, between the various distributions of activity for one and the same mask. By way of example, a mask coded on 4 bits will be considered hereinafter.

In particular, referring for example to FIG. 2, the invention renders the activity of the register M containing the mask m independent of the activity of the register R containing the masked variable x⊕m. If the variable x does not influence the distributions of consumption that are specific to these two registers 22, 23, it is no longer possible to successfully conduct an HO-DPA attack such as that described in the document by Peeters et al. The balance may be struck by modifying the structure of the path of the mask without touching the path of the masked variable. The proposed modifications can be done either in space, by transforming the mask, or in time, by changing the evolution of the mask. Advantageously, the invention relates to the transformation of the mask. According to the invention, several mask modifications are possible.

Figure 4:
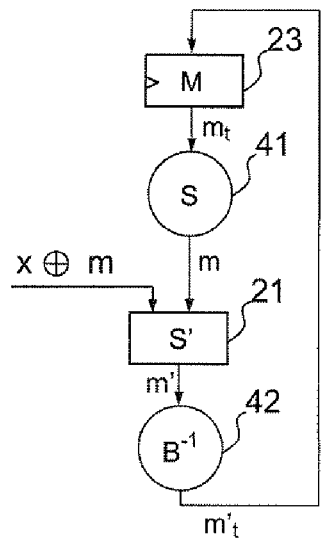
FIG. 4, an illustration of a first mode of possible modification of the path of a mask in a circuit according to the invention.

FIG. 4 illustrates a first possible modification of the mask, a modification by bijection. In this case, a bijective transformation 41, denoted S is inserted between the mask register 23, register M, and the S-box 21, with function S'. The inverse bijective transformation 42, denoted $B^{-1}$, is applied at the output of the S-box. Thus, the mask a delivered by the S-box S' undergoes the bijective transformation $B^{-1}$ before being stored in the register M. The bijection is such that the Hamming distance between m and its image B(m) is not always zero so as to modify the correlation of the activity between the variable x⊕m and B(m). The implementation of the bijection B can be done through a predefined table.

The mask m' on output from S-box S' is that actually used by the masked variable. FIG. 4 illustrates the path of the mask.

Figure 5:
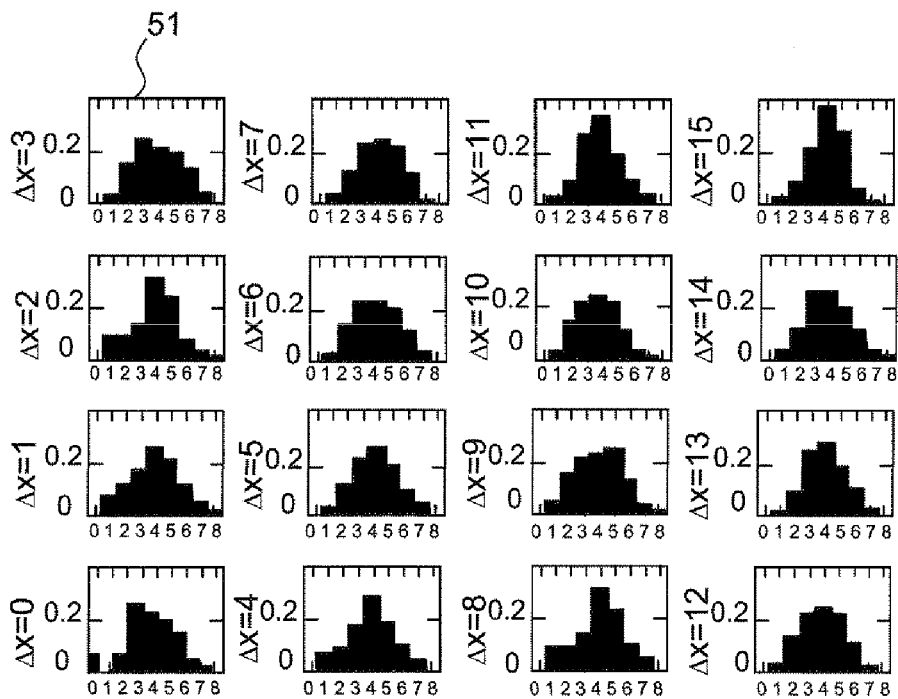
FIG. 5, a presentation of the activity distribution corresponding to the previous mode.

FIG. 5 shows the 16 distributions 51 obtained after transformation of the mask by a bijection such as illustrated by FIG. 4, for the 16 values of Δx for a mask coded on 4 bits as in the case of FIG. 3, therefore with the same activity values that can range from 0 to 8. These distributions 51 exhibit small mutual differences, in contradistinction to the distributions of FIG. 3. The distributions of the activity are much more homogeneous, this being confirmed by the χ2 test which gives a mean value of 1.85 with this bijective transformation, to be compared with the value of 21.89 corresponding to the distribution of FIG. 3.

Figure 6:
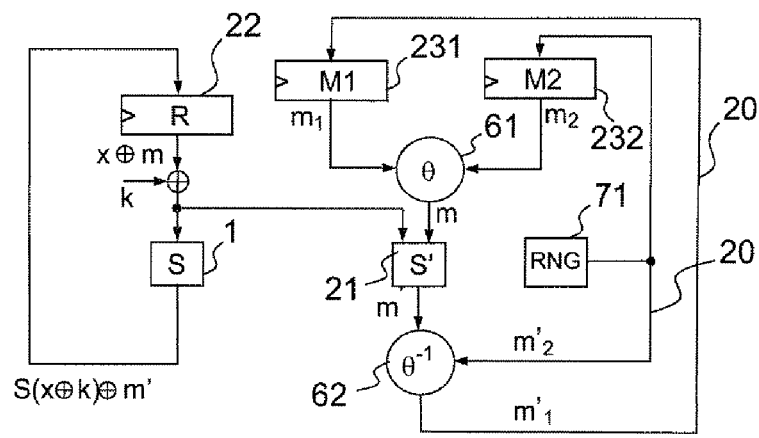
FIG. 6, an illustration of a second possible embodiment of the path of a mask in a circuit according to the invention.

FIG. 6 illustrates another possible modification according to the invention. It involves a modification of the mask by decomposition. In this case, the mask m is decomposed into two sub-masks $m_1$ and $m_2$ such that:

$$m = m_1 \theta m_2$$

θ realizing a group internal composition law, like the operator θ mentioned previously. θ being a group operator, it admits an inverse operator $\theta^{-1}$.

The register M of the previous figures is therefore replaced with two registers 231, 232. One register M1 contains the value $m_1$ and one register M2 contains the value $m_2$. The output of these registers is linked to a circuit 61 realizing the composition law θ. On output from this operator 61, the mask m is recomposed by the operation $m=m_1\theta m_2$ before being transformed into a new mask m' by the S-box S', 21 as in the previous paths illustrated notably in FIGS. 2 and 4.

The inverse operation $\theta^{-1}$ is performed by an operator 62 placed at the output of the S-box S' 21. This operator makes it possible to separate the mask m' into $m'_1$ and $m'_2$ such that $m'_1 = m'\theta^{-1}m'_2$. The mask $m'_2$ may be generated by a random generator RNG as illustrated in FIG. 6. At each iteration of the encryption algorithm the register M2 containing $m_2$ takes a new value $m'_2$ originating from the random generator 71. The register M1 containing $m_1$ takes a new value $m'_1 = m'\theta^{-1}m'_2$, this value is delivered by the operator 62 which performs the group operation $\theta^{-1}$ on the basis of the input datum m' provided by the S-box 21 and the input datum $m'_2$ provided by the random generator 71.

The activity A at the level of the register R containing the masked variable x⊕m and of the two registers M1 and M2 therefore becomes:

$$A(x \oplus m) = PH(\Delta x \oplus \Delta m) + PH(\Delta m_1) + PH(\Delta m_2) \quad (4)$$

Considering this activity model, the $\chi 2$ test is applied for various laws θ and the results are illustrated, by way of example, by the chart hereinbelow:

| θ | Without modifications | B(a) | A XOR b | a + b | a * b | a * b + (a + b)/2 | aαb |
|---|---|---|---|---|---|---|---|
| $\chi^2$ | 21.89 | 1.85 | 16.69 | 0.31 | 0.36 | 0.18 | 0 |

This chart shows that the simple operators like addition + and multiplication * may be used to obtain balanced distributions, the results obtained being respectively 0.31 and 0.36, thereby pushing back the attack to an extremely high number of consumption traces to be acquired in order to discriminate between the distributions. The transformation by bijection B makes it possible to obtain a result of 1.85.

Advantageously the law α, described subsequently, makes it possible to have a zero $\chi 2$ that is to say distributions that are perfectly identical in the sense of the activity model considered and therefore resistant to high-order attacks.

Figure 7:
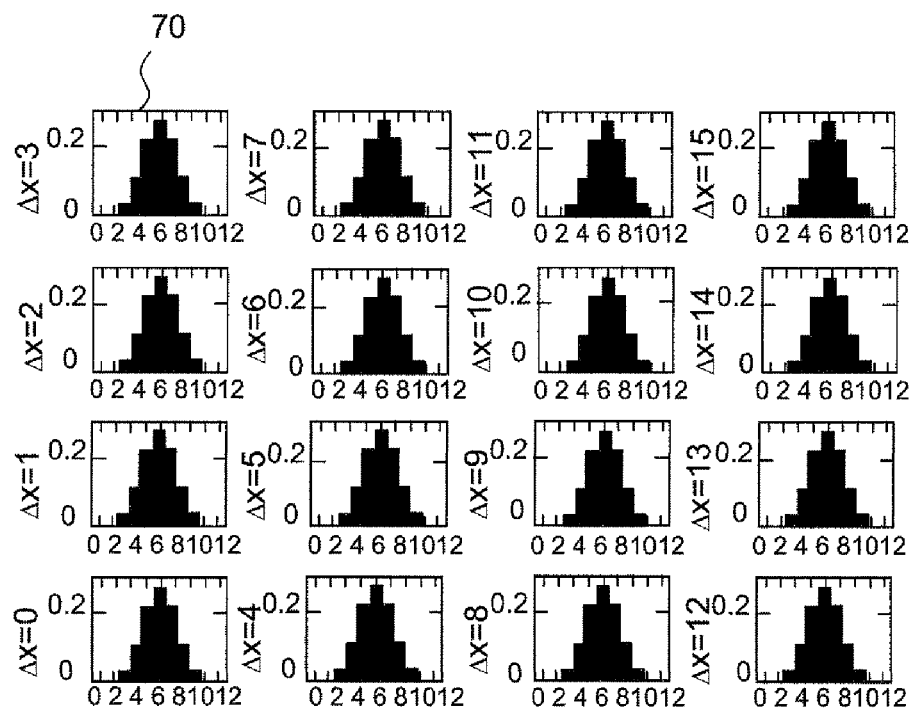
FIG. 7, a presentation of the activity distribution corresponding to the previous mode.

FIG. 7 illustrates the 16 possible distributions 70 with 4 bits per variable and considering the law α.

The distributions obtained with the XOR logical operator do not allow a sufficient reduction in the value of $\chi 2$ since they engender two large classes of distribution as a function of the parity of the Hamming weight of $\Delta x$, $PH(\Delta x \oplus m)$. If $\Delta x$ is even, the activity always has even values while if $\Delta x$ is odd the activity always has even values.

Figure 8:
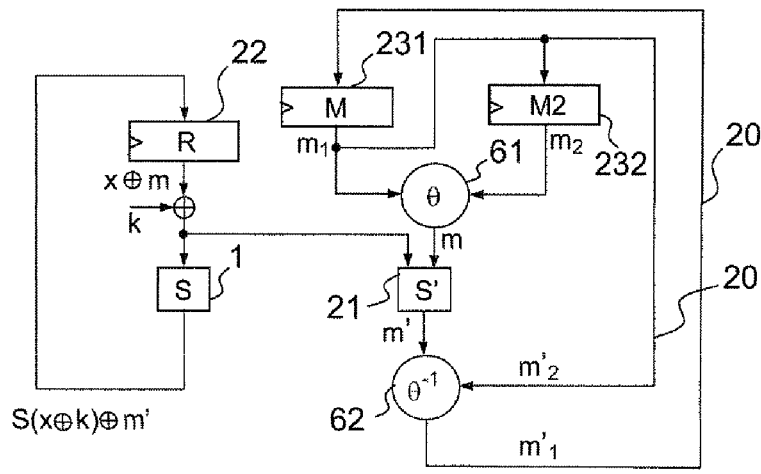
FIG. 8, an example of modification with decomposition of the masks without use of a random generator.

FIG. 8 illustrates an exemplary implementation which gives a result analogous to the previous solution but without the use of a random generator, except to initialize the computation. So as to avoid the overhead related to the use of a random generator at each cycle, one of the two sub-masks can replace the random variable generated in the previous example. It is for example possible to use the sub-mask arising from the register M1, 231. This sub-mask arising from the register M1 is saved in the register M2, 232, at the end of the cycle, the register M1 receiving for its part the new mask m'$_1$ so as to reconstruct the complete mask. Thus, the new mask generated at each cycle is m'=m'$_1$θm$_1$, at the following cycle the new mask generated is m"=m"$_1$θm'$_1$ and so on and so forth.

Figure 9:
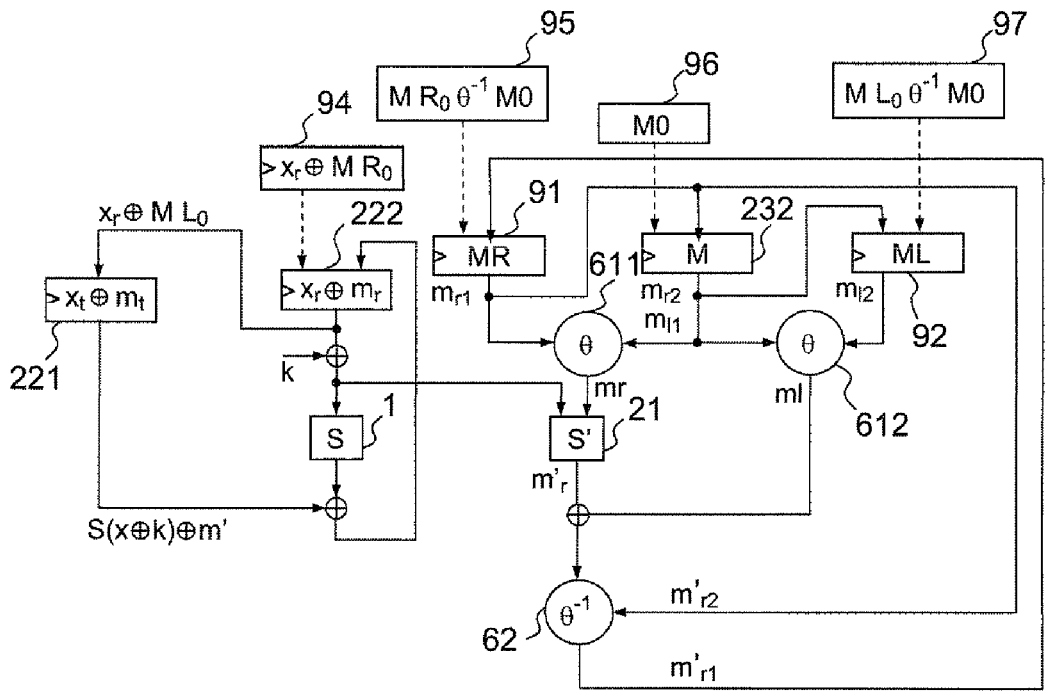
FIG. 9, an exemplary realization of masking according to the invention in the case of the use of a DES algorithm.

FIG. 9 illustrates an example of masking for the DES algorithm. In this figure the expansion and permutation functions have been ignored for readability purposes.

As regards the DES algorithm, the data path is split into two parts, left and right, as in any Feistel scheme. In particular, the masked-variables register 22 of the previous examples is split into two registers, a left register 221 and a right register 222.

As regards the masking part, in addition to the two mask registers 91, 92, one the right register MR and the other the left register ML, a third register 232, denoted M, is added so as to decompose the two masks, left and right. The implementation of the DES algorithm utilizes the solution set forth previously, in relation to FIGS. 7 and 8, without using a random generator at each cycle but by using three chained registers. The register MR contains the sub-mask m$_{r1}$ and the register ML contains the sub-mask m$_{l2}$. The register M contains the sub-mask m$_{r2}$ equal to the sub-mask m$_{l1}$. The effective values of the right m$_r$ and left m$_l$ masks respectively contained in the registers MR and ML are given by the following relations:

$m_r = m_{r1} \theta m_{r2}$ $m_l = m_{l1} \theta m_{l2}$.

Operators 611, 612 carrying out the group relation θ are placed at the output of the registers MR, M, ML so as to perform the above two operations. The right mask m$_r$ is transformed by the S-box S', 21 into a new right mask m'$_r$, the other input of the S-box 21 being the masked variable x$_r \oplus m_r$, thereafter encrypted, coming from the right register R 222. The new right mask m'$_r$ is combined with the mask m$_l$ to give m'$_r \oplus m_l$ on input to the operator 62 carrying out the operation $\theta^{-1}$. The latter combines m'$_r \oplus m_l$ with m'$_{r2}$. In a manner analogous to the example of FIG. 8, the sub-mask m'$_{r2}$ on input to the operator 62 is not provided by a random generator but is equal to the sub-mask m$_{r1}$ delivered by the register MR. Each register 221, 222, 91, 92, 93 receives an initial value 94, 95, 96, 97.

The chart hereinbelow presents the masks used equally well in the mask registers 91, 92, 93, in the last three columns and in the masked-variables registers 221, 222, in the previous two columns, for three consecutive rounds:

| Round | Right mask | Left mask | MR | M | ML |
|---|---|---|---|---|---|
| 0 | ML0 | MR0 | M0 | MR0 $\theta^{-1}$ M0 | ML0 $\theta^{-1}$ M0 |
| 1 | MR0 | m'$_r$ | MR0 $\theta^{-1}$ M0 | m'$_{r1}$ | M0 |
| 2 | m'$_r$ | m"$_r$ | m'$_{r1}$ | m"$_{r1}$ | MR0 $\theta^{-1}$ M0 |

This chart shows that the masks used in the mask registers as well as those used in the masked-variables registers are different and consequently make it possible to avoid notably an attack of the HO-DPA type.

Figure 10:
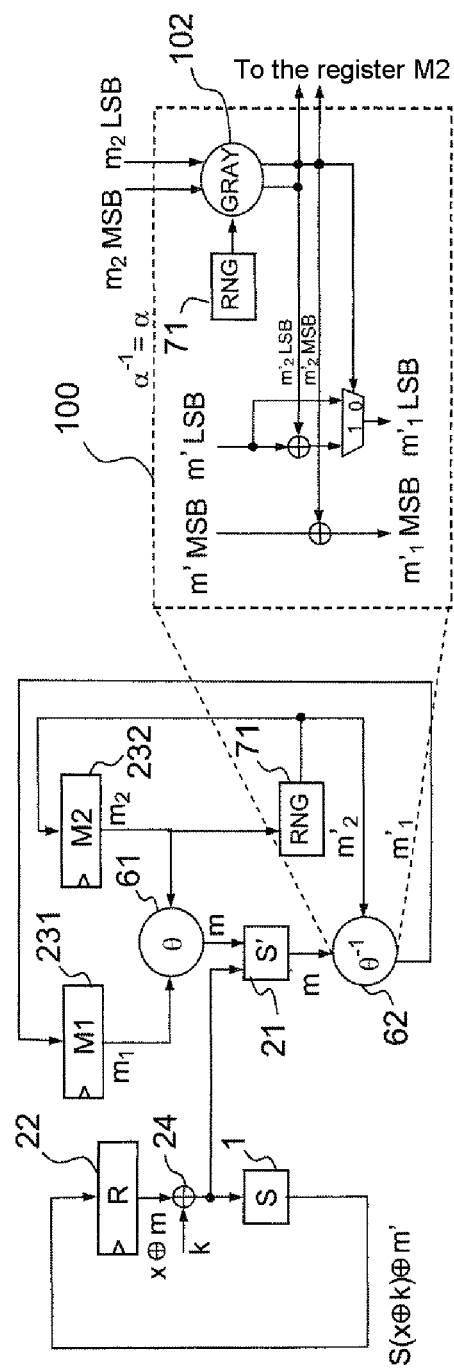
FIG. 10, an exemplary realization of a group composition law used in a circuit according to the invention.

An implementation of the function α making it possible to have balanced distributions, therefore $\chi 2$ zero.one is illustrated by FIG. 10.

This law relies on the fact that $\Delta m_2$ is never zero. Indeed if the variation of m, $\Delta m = \Delta m_2 = 0$, the group law θ implies that $\Delta m_1$ is also equal to 0. In this case, the activity given by the previous equation (4) may be zero only if $\Delta x$ is zero. As no other values of $\Delta x$ for obtaining a zero activity exist, this shows that the activity will never be perfectly balanced for all values of $\Delta x$. On the other hand, if the value of $\Delta m_2$ is non-zero, laws may exist which make it possible to satisfy the perfect balance of the activity distributions and thus to obtain $\chi 2 = 0$. With respect to the proof of impossibility of masking, such as envisaged notably in the document by G. Piret et al: Security Analysis of Higher-Order Boolean Masking Schemes for Block Ciphers, IET Information Security, 2(1): 1-11, 2008, the invention provides a linking relation between the two masks m$_1$ and m$_2$, this not being taken into account in the document by G. Piret et al.

Considering by way of example the sub-masks per successive packets of 2 bits, the mask then having an even number of bits, which is often the case, the following law called α makes it possible to obtain a balanced distribution whatever the values of $\Delta x$. The 2-bit group formed of the high-order bit of the sub-mask m$_2$, denoted m$_2$MSB, and of the low-order bit, denoted m$_2$LSB, conditions in the following manner the generation of the mask by the law α:

$\Delta m_2 = 1$ per groups of 2 bits;

m=m$_1 \oplus$ m$_2$ if m$_2$MSB=1 or m=m$_1$ if m$_2$MSB=0

This law α is involutive and is implemented by the operator 61 on input to the S-box 21.

FIG. 10 moreover presents an exemplary possible implementation 100 of the operator 62, situated at the output of the S-box 21, implementing the function m'$_1$=m'α$^{-1}$m'$_2$ for a group of 2 mask bits.

The circuit 100 uses a random generator 71 to produce the sub-mask $m_2$. The random variable delivered by this generator 71 selects, in a coder 102 which receives as input $m'_2$MSB and $m'_2$LSB, either an incrementation or a decrementation on the register M2 which is Gray coded (or reflected binary code) so as to ensure the condition $\Delta m'_2 = 1$. Starting from the mask m' produced by the S-box 21, the operator 62 delivers a sub-mask $m'_1$ whose high-order bit $m'_1$MSB is equal to m'MSB⊕$m_2$MSB, m'MSB being the high-order bit of m' and $m'_2$MSB taking the value 0 or 1 according to the random variable generated on input to the coder 102. The low-order bit $m'_1$LSB is equal to m'MSB or to m'LSB⊕$m'_2$LSB if the value of $m'_2$MSB is respectively equal to 0 or to 1.

Figure 11C:
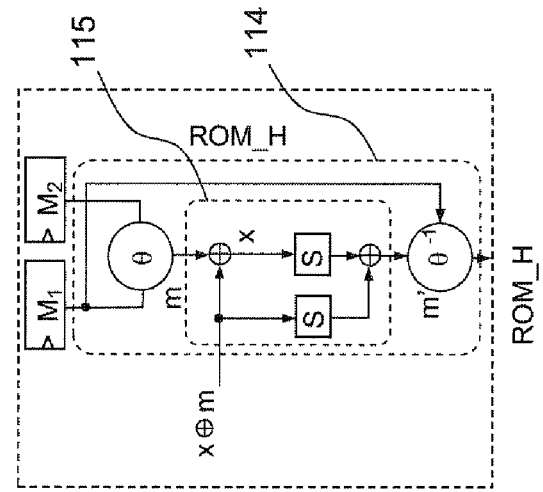
FIGS. 11a, 11b and 11c, exemplary embodiments of a second substitution box used in a circuit according to the invention.
Figure 11B:
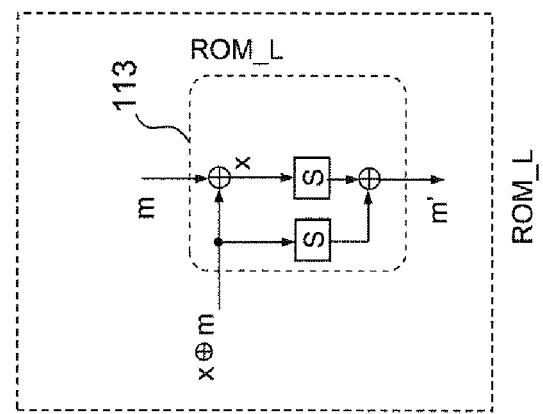
Figure 11A:
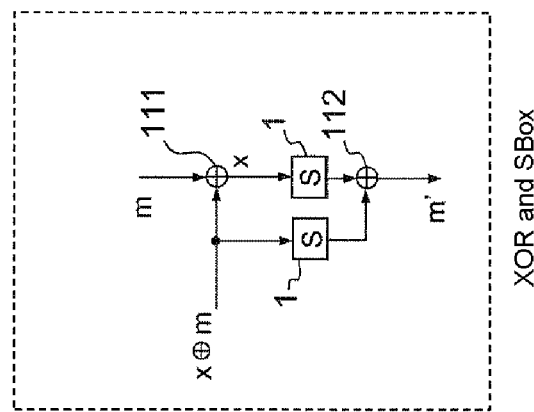

FIGS. 11a, 11b and 11c present possible improvements for producing the substitution box S', 21 which produces the new mask m'. The box S' may be produced with a mixture of XOR gates and of ROM memories, according to several levels of robustness and complexity.

FIG. 11a presents a first solution using two boxes S, 1 and two XOR gates 111, 112 to reconstruct the non-masked information x and the new mask m'. Thus, x=m⊕x⊕m is obtained through the first gate 111, and the second gate 112 delivers the new mask m' as output from the box S' with m'=S(x⊕m)⊕S (x).

A second solution, illustrated by FIG. 11b, uses a ROM memory 113 to carry out the logic of the XOR gates and the substitution of the boxes S of the arrangement of FIG. 11a. The memory then receives two words, m and x⊕m.

FIG. 11c presents a third solution which may be applied for a spatial decomposition without random register 71. This solution uses a ROM memory 114 receiving three words x⊕m, $m_1$ and $m_2$. This memory integrates the logic and the function 115 that are carried out by the memory 113 of the solution of FIG. 11b and the group law θ for the reconstruction of the mask m on input to the function 115 as well as for example the inverse group law $θ^{-1}$ on output from this function 115.

The invention claimed is:

1. A cryptography circuit comprising:
at least one register R providing a variable x masked by a mask variable m, said masked variable being encrypted by a first substitution box S in a cyclic manner, and
a mask register M delivering at each cycle a transformed mask $m_t$ equal to the mask m transformed by a modification function, the mask m being encrypted by a second substitution box S', a new mask m' obtained on output from the second substitution box S' being used to mask the variable,
wherein the modification is a bijection B such that the transformed mask $m_t$ is stored in the register M, the mask m applied to the substitution box being equal to $B(m_t)$ and a new value to be stored in a register being $B^{-1}(m')$, m' being the output from the second substitution box S'.

2. The circuit according to claim 1, wherein the new transformed mask $m'_t$ is introduced into the mask register M after having been subjected to the modification inverse to said modification function on output from the second substitution box S'.

3. The circuit according to claim 1, wherein the bijection B is such that a Hamming weight of the mask m is one of identical and not identical to a Hamming weight of its image under the bijection B(m).

4. The circuit according to claim 1, further comprising an encipherment algorithm of a DES type, a path of the data x, m is split into two parts, left and right, said circuit comprises in addition to a left mask register ML and a right mask register MR a third mask register M, the register MR containing a right sub-mask $m_{r1}$ and the register ML containing a left sub-mask $m_{l2}$, the register M containing a sub-mask $m_{r2}$ equal to a sub-mask $m_{l1}$, effective values of a right mask $m_r$ and of a left mask $m_l$ being such that:

$m_r = m_{r1} \theta m_{r2}$ $m_l = m_{l1} \theta m_{l2}.$

5. The circuit according to claim 1, wherein the second substitution box S' comprises two boxes identical to the first substitution box S and two XOR gates, the outputs of the two boxes being connected to an XOR gate whose output delivers the new mask m', the masked variable (x ⊕ m) entering a box and on the other XOR gate whose other input receives the mask m, the output of this gate entering the other box.

6. The circuit according to claim 5, wherein a ROM memory carries out the logic of the XOR gates and the substitution of the boxes.

7. A cryptography circuit comprising:
at least one register R providing a variable x masked by a mask variable m, said masked variable being encrypted by a first substitution box S in a cyclic manner, and
a mask register M delivering at each cycle a transformed mask $m_t$ equal to the mask m transformed by a modification function, the mask m being encrypted by a second substitution box S', a new mask m' obtained on output from the second substitution box S' being used to mask the variable,
wherein the modification of the mask m is performed by decomposition into two sub-masks $m_1$ and $m_2$ such that $m = m_1 \theta m_2$ where θ is a group composition law, the first sub-mask $m_1$ being stored in a first mask register M1 and the second sub-mask $m_2$ being stored in a second mask register M2, a new value to be stored in the register M1 being $m'_1 = m' \theta^{-1} m'_2$ and the new value to be stored being $m'_2$, m' being a value of the mask on output from the second substitution box S'.

8. The circuit according to claim 7, wherein the composition law is the XOR "exclusive or" operation.

9. The circuit according to claim 7, wherein the composition law is the addition operation.

10. The circuit according to claim 7, wherein the composition law is the multiplication operation.

11. The circuit according to claim 7, wherein the composition law is the operation of the type s=a*b+(a+b)/2, * being multiplication and + being addition.

12. The circuit according to claim 7, wherein the composition law has a Hamming distance between two consecutive sub-masks $m_2$ from one cycle to another, $\Delta m_2$, that is non-zero.

13. The circuit according to claim 12, wherein the sub-masks $m_1$, $m_2$ having an even number of bits, the group composition law (α) making it possible to obtain the mask m on the basis of the sub-masks $m_1$, $m_2$ satisfies:
$\Delta m_2 = 1$ per groups of 2 bits;
$m = m_1 \oplus m_2$ if $m_2$MSB=1 or $m = m_1$ if $m_2$MSB=0
$m_2$MSB, $m_2$LSB being respectively the high-order and low-order bits of the sub-mask $m_2$.

14. The circuit according to claim 7, further comprising:
a random-values generator, said generator delivering the value of the second sub-mask $m'_2$.

15. The circuit according to claim 5, wherein the sub-mask $m_1$ arising from the first mask register M1 is saved in the second mask register M2 at the end of the cycle, the first register M1 receiving for its part the new mask $m'_1$ so as to reconstruct the new complete mask $m' = m'_1 \theta m'_2$.

* * * * *